BEST AVAILABLE COPY

W. C. SABINE AND R. GUASTAVINO.

J. D. K. SABINE, EXECUTRIX OF W. C. SABINE, DEC'D.

SOUND ABSORBING MATERIAL FOR WALLS AND CEILINGS.

APPLICATION FILED JULY 24, 1918.

Reissued Nov. 23, 1920. 14,992.

Fig. 1.

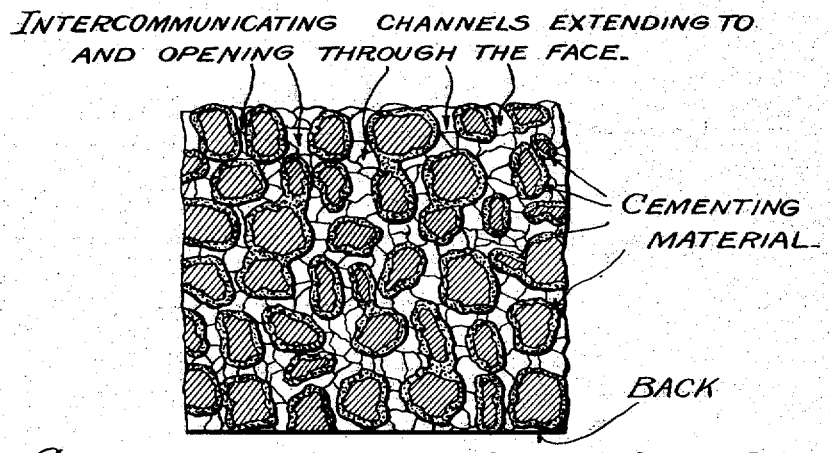

GRANULAR BODY MATERIAL SUCH AS SAND OR PUMICE GRADED TO A SUBSTANTIALLY UNIFORM SIZE GRANULES OR PARTICLES BONDED AT POINTS OF CONTACT AS SHOWN BY SECTIONED PARTICLES.

Fig. 2.

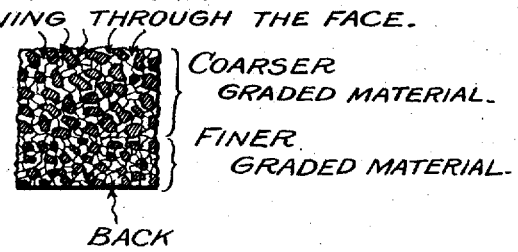

Inventors

Wallace Clement Sabine,
Rafael Guastavino,

Witness

Chas. L. Griesbauer

By A. D. Wickenden

Attorney

UNITED STATES PATENT OFFICE.

WALLACE CLEMENT SABINE, OF BOSTON, MASSACHUSETTS, AND RAFAEL GUASTAVINO, OF BAY SHORE, NEW YORK; JANE D. KELLY SABINE EXECUTRIX OF SAID WALLACE C. SABINE, DECEASED.

SOUND-ABSORBING MATERIAL FOR WALLS AND CEILINGS.

14,992. Specification of Reissued Letters Patent. Reissued Nov. 23, 1920.

Original No. 1,197,956, dated September 12, 1916, Serial No. 60,225, filed November 8, 1915. Application for reissue filed July 24, 1918. Serial No. 246,613.

*To all whom it may concern:*

Be it known that we, WALLACE CLEMENT SABINE and RAFAEL GUASTAVINO, citizens of the United States, residing, respectively, at Boston, in the county of Suffolk and State of Massachusetts, and Bay Shore, county of Suffolk, and State of New York, have invented certain new and useful Improvements in Sound-Absorbing Materials for Walls and Ceilings, of which the following is a specification.

The object of our invention is to provide a structural material suitable for facing walls and ceilings in auditoriums and the like, which shall correct certain types of acoustical difficulties by the prevention of excessive reverberation and echo and injurious focusing of sound.

In our Patent No. 1,119,543, issued December 1, 1914, we disclosed primarily a ceramic masonry material suitable for this purpose. Ceramic materials are, however, expensive and difficult to manufacture, as the porous blocks described in said patent have a tendency to warp when subjected to the heat necessary to fuse the flux, which when cooled, gives strength and solidarity to the finished material or tile, and the object of the present invention is to provide a material suitable for the purposes described, which will be easily and cheaply manufactured.

In the accompanying drawings:—

Figure 1 is an exaggerated sectional view illustrating the primary embodiment of the invention, and Fig. 2 is a sectional view illustrating that embodiment of the invention wherein separate layers of different grades are employed to provide a graded porosity.

Our process of manufacture is as follows:—

A given quantity of sand, crushed stone, brick, or similar material, consisting of fine particles of suitable size, are mingled with a sufficient quantity of binding material, as for instance, Portland cement, to secure the particles firmly to each other at the points of contact; we have found that three parts of sand which will just pass through a sieve, about twelve meshes to the inch, and one part of Portland cement produce satisfactory results. If Portland cement is used, the requisite quantity of water must also be supplied to render the cement active. After these materials have been thoroughly mixed, they are placed in a suitable mold and the cement is allowed to set, thereby securing the particles to each other with irregular intercommunicating pores of variant dimensions between the particles, which openly penetrate the exposed finished face of the material.

From the foregoing it will be apparent that the essential feature of the present invention is the use of material graded to a substantially uniform size, so that finer grades of material which would otherwise fill into the pores of the finished article are eliminated. The ideal condition would be materials which are graded to the same size, but in the practical carrying forward of the invention the grading within two or three meshes of screens, so that all of the material is of a substantially uniform size, is sufficient for the purpose. In this connection the purpose of the present invention is to obtain fine particles of sand or various other granular materials, such for instance, as pumice, which are so graded that when employed in mass with a relatively small quantity of cement will have only limited points of contact, leaving pores or interstices between, and at these points of contact, the cement will act as a binding agent without in any way filling or obstructing free communication between the pores. This characteristic of the improved material is shown in the accompanying drawings in which Fig. 1 is a greatly exaggerated sectional view, showing one general size of granules throughout, and Fig. 2 is also an enlarged sectional view illustrating separate layers of different grades to provide a graded porosity.

In carrying forward this improved process, the new article resulting therefrom embodies, as hereinbefore indicated the distinguishing characteristic of the article covered by our former Patent No. 1,119,543, namely, that of intercommunicating pores extending throughout the mass and openly penetrating the exposed finished surface.

The power of our product to absorb sounds of different pitches is dependent to a very large extent upon the dimensions of the pores between the particles of which it is composed, and the dimensions of these pores are largely dependent upon the dimensions of the particles; in other words, material composed of comparatively coarse particles is better adapted for the absorption of sounds of a low pitch, whereas material composed of finer particles is better adapted for the absorption of sounds of higher pitch. We have determined by carefully conducted scientific tests that a graded porosity, with the larger pores in the front and the smaller pores in the rear increases the range in pitch over which our product is acoustically absorbed, and also increases its total absorbing power.

A product of this type may be produced by partially filling a mold with sand of the desired size, mixed with cement and water, allowing it to partially set, and then filling the mold with coarser sand, also mixed with cement and water. The material may also be made by forming the finer mixture into the desired shape and then forming the coarser mixture into the desired shape while in contact with the finer mixture, without placing the material in a mold.

Carefully conducted scientific tests have also shown that our finished product manufactured according to our process above described, will absorb much in excess of 15% of sounds lying in the pitch between the middle C and the third octave above middle C, which are the characteristic sounds whch distinguish articulate speech.

In practice we have also found that material constructed as we have described is capable of sustaining a considerable crushing load and is, independent of the sound absorbent qualities, desirable masonry material, resistant to fire, and presents a pleasing appearance when in position on walls or ceilings.

We do not wish to limit ourselves to any particular materials, as it is apparent that material other than sand and Portland cement, as, for instance, crushed rock, or crushed brick and lime or plaster of Paris, may be used without departing from the spirit of our invention.

We claim:—

1. A sound-absorbent material for walls, floors, and ceilings, consisting of particles of body material graded to approximately uniform size and bonded to each other at their points of contact.

2. A sound-absorbent material adapted to be secured to and form the exposed finished face of walls, floors and ceilings, consisting of particles of body material graded to approximately uniform size and bonded to each other at their points of contact.

3. A sound absorbent material for walls, floors and ceilings, consisting of particles of body material graded to approximately uniform size and bonded to each other at their points of contact, the size of the particles being such that when so bonded together the interstices between the particles possess the property of absorbing in excess of fifteen per centum of sounds lying in the pitch between middle C and the third octave above middle C.

4. A sound-absorbent wall, floor or ceiling including a facing of sound-absorbent material consisting of particles of body material graded to approximately uniform size and bonded to each other at their points of contact.

5. A sound-absorbent wall, floor or ceiling having, in combination, a supporting structure and attached thereto, an exposed layer of sound-absorbent material consisting of particles of body material graded to approximately uniform size and bonded to each other at their points of contact.

6. A sound-absorbent material for walls, floors and ceilings composed of particles of body material bonded to each other at limited points of contact, thereby providing pores expanding and contracting in cross-section, which intercommunicate and openly penetrate the exposed surface; the said body particles being graded to approximately uniform size so as to produce pores of such variant proportional dimensions as to possess the property of absorbing in excess of fifteen per centum of sound lying in the pitch between middle C and the third octave above middle C.

7. A sound absorbing material for walls and ceilings consisting of a body of graded porosity having the larger pores in and adjacent the front finished surface and the smaller pores in rear of the larger pores.

8. A sound absorbing material for walls and ceilings consisting of a porous body of relatively fine and coarse particles of material arranged in separate layers to provide a graded porosity.

9. A sound-absorbent material for walls, floors and ceilings consisting of particles of body material and a binding substance bonding said particles to each other only at their points of contact so as to form a cellular material.

10. A sound-absorbent material adapted to be secured to and form the exposed finished face of walls, floors and ceilings, consisting of particles of body material and a binding substance bonding said particles to each other only at their points of contact so as to form a cellular material.

11. A sound-absorbent material for walls, floors and ceilings consisting of particles of body material bonded to each other only at their points of contact, the size of the particles being such that when so bonded together the interstices between the particles possess the property of absorbing in excess of fifteen per cent. of sounds.

12. A sound-absorbent material for walls, floors and ceilings consisting of particles of body material bonded to each other at limited points of contact thereby providing Draftman pores which intercommunicate and openly penetrate the exposed surface and which possess the property of absorbing in excess of fifteen per cent. of sounds.

13. The method of producing a sound absorbing material of the kind described which consists in providing particles of material with a coating of binding substance and bonding said coated particles to each other at their points of contact only in the form of a cellular sound absorbent material.

In testimony whereof we hereunto affix our signatures.

WALLACE CLEMENT SABINE.
RAFAEL GUASTAVINO.